(12) United States Patent
Niemoeller

(10) Patent No.: US 10,166,915 B2
(45) Date of Patent: Jan. 1, 2019

(54) SETTING AID FOR A REAR-VIEW MIRROR IN A MOTOR VEHICLE

(71) Applicant: Continental Automotive GmbH, Hannover (DE)

(72) Inventor: Meinrad Niemoeller, Huettenberg-Rechtenbach (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 15/766,742

(22) PCT Filed: Sep. 20, 2016

(86) PCT No.: PCT/EP2016/072244
§ 371 (c)(1),
(2) Date: Apr. 6, 2018

(87) PCT Pub. No.: WO2017/060069
PCT Pub. Date: Apr. 13, 2017

(65) Prior Publication Data
US 2018/0297517 A1    Oct. 18, 2018

(30) Foreign Application Priority Data
Oct. 9, 2015 (DE) .......................... 10 2015 219 637

(51) Int. Cl.
*B60Q 3/80* (2017.01)
*B60Q 3/70* (2017.01)
*B60R 1/04* (2006.01)

(52) U.S. Cl.
CPC .................. *B60Q 3/80* (2017.02); *B60Q 3/70* (2017.02); *B60R 1/04* (2013.01)

(58) Field of Classification Search
CPC .... B60Q 3/80; B60Q 3/70; B60Q 3/04; B60R 1/025; B60R 1/086; B60R 1/12
(Continued)

(56) References Cited

U.S. PATENT DOCUMENTS 3,522,584 A * 8/1970 Yorck .................. B60Q 1/2665
                                                         15/250.003
3,680,951 A * 8/1972 Jordan .................... B60R 1/087
                                                         359/606
(Continued)

FOREIGN PATENT DOCUMENTS

DE           3613556 A1    10/1987
DE         10064937 A1     7/2002
(Continued)

OTHER PUBLICATIONS

International Search Report and Written Opinion dated Dec. 5, 2016 from corresponding International Patent Application No. PCT/EP2016/072244.
(Continued)

*Primary Examiner* — Ojiako K Nwugo

(57) ABSTRACT

A setting aid for a rear-view mirror in a motor vehicle has one or more illumination means in spatial proximity to one or more edges of a rear window or at the rear of the motor vehicle. The one or more illumination means are arranged such that if the motor vehicle is in dark surroundings and the one or more illumination means are switched on, the edge of the rear window or a lateral contour of the motor vehicle stands out, when looking in the rear-view mirror, at least in certain regions from the surroundings behind the motor vehicle. A first means is provided which automatically switches on the one or more illumination means during the setting of the rear-view mirror if a setting of the rear-view mirror is required, which is assumed to be required if a change in the setting of the driver's seat has been noticed.

8 Claims, 2 Drawing Sheets

(58) Field of Classification Search
USPC .......................................................... 340/457
See application file for complete search history.

(56) References Cited

U.S. PATENT DOCUMENTS

| | | | | |
|---|---|---|---|---|
| 7,551,987 | B2* | 6/2009 | Ota | G08B 21/06 340/576 |
| 2002/0048094 | A1 | 4/2002 | Witt | |
| 2002/0052680 | A1* | 5/2002 | Whitten | B60R 1/025 701/49 |
| 2006/0018641 | A1* | 1/2006 | Goto | B60R 25/1004 396/4 |
| 2010/0177413 | A1* | 7/2010 | Lee | B60R 1/025 359/843 |
| 2013/0229522 | A1* | 9/2013 | Schofield | B60C 23/00 348/148 |
| 2016/0185295 | A1* | 6/2016 | Lu | B60R 1/087 348/78 |

FOREIGN PATENT DOCUMENTS

| | | |
|---|---|---|
| DE | 102011117499 A1 | 5/2012 |
| EP | 1544025 A2 | 6/2005 |
| KR | 20010009284 A | 2/2001 |

OTHER PUBLICATIONS

Office Action dated Jun. 24, 2016 from corresponding German Patent Application No. 10 2015 219 637.2.

* cited by examiner

SETTING AID FOR A REAR-VIEW MIRROR IN A MOTOR VEHICLE

BACKGROUND

The invention relates to an adjustment aid for a rearview mirror in a motor vehicle.

When adjusted correctly, the rearview mirror in a motor vehicle allows a driver to look behind through the rear window of the motor vehicle in order to observe the rearward traffic. The correct adjustment of the rearview mirror depends on the seated position and body size of the driver and should be checked or set by every driver prior to driving. When adjusted correctly, the view to the rear is impaired to the least possible extent by a rear-window frame or by the backrest of a rear bench or the headrests thereof, to the extent that these are present.

When it is dark, for example in a dark garage or on an unlit road, the process of adjusting the rearview mirror may be impaired by virtue of the rear-window frame not standing out clearly enough from the view through the rear window, such that the rearview mirror has not been adjusted correctly prior to driving.

In order to solve this problem, the driver may, for the purposes of adjusting the rearview mirror, switch on the interior lighting of his vehicle so that the rear-window frame stands out better from the dark surroundings visible through the rear window. However, this solution is disadvantageous in that the eyes of the driver require a certain amount of time after switching off the interior light to become accustomed again to the dark. During this time, dangerous situations may not be recognized in a timely fashion under certain circumstances. Moreover, this is connected to additional manipulations which, under certain circumstances, are also still preceded by a search for the light switch, for example if a driver uses a vehicle for the first time.

Alternatively, after the start of the journey, the driver may repeat the adjustment process as soon as enough light is available from other sources, for example from streetlamps or other vehicles, if the driver determines that the rearview mirror has not been adjusted correctly. However, particularly in the case of changing light conditions during the journey, this entails a distraction for the driver which may likewise lead to dangerous situations not being recognized in a timely fashion under certain circumstances.

BRIEF SUMMARY

The invention specified in the patent claims simplifies the adjustment of rearview mirrors in motor vehicles in the dark.

An adjustment aid according to the invention for a rearview mirror in a motor vehicle provides one or more lighting means which are arranged in the spatial vicinity of one or more edges of a rear window of the motor vehicle or at the rear of the motor vehicle. The one or more lighting means are arranged in such a way that, when the motor vehicle is situated in dark surroundings and the one or more lighting means are switched on, the edge of the rear window or a lateral contour of the motor vehicle stands out, at least in portions, from the surroundings behind the motor vehicle when the rearview mirror is looked at. Moreover, a first means is provided, said first means automatically switching on the one or more lighting means during the adjustment.

In one exemplary embodiment, the one or more lighting means are position lights, for example small lamps or light-emitting diodes, attached in the vicinity of the frame of the rear window or to the frame and the rearview mirror is attached to, or in the vicinity of, the windshield. The position lights preferably shine with a red color because red light impairs the adaptation of the human visual system to viewing in the dark to a comparatively small extent. All position lights are visible in the rearview mirror when the rearview mirror is adjusted correctly. By way of example, if provision is made for four position lights in the four corners of the rear window, the four position lights should be visible in the rearview mirror when the latter has been adjusted correctly.

In another exemplary embodiment, an interior lighting of the motor vehicle is automatically switched on when the rearview mirror is adjusted. Preferably, only a rear interior lighting is switched on. As a result, the frame of the rear window is illuminated while the rearward surroundings of the motor vehicle continue to remain dark, such that the edge of the rear window clearly stands out. When the rearview mirror is adjusted correctly, the entire edge of the rear window can be seen in the rearview mirror. If the color of the interior lighting is adjustable, an advantageous red color may be set while the rearview mirror is adjusted. Further, it is possible to switch on the interior lighting with a reduced brightness when the rearview mirror is adjusted in order to speed up the adaptation of the eyes to the darkness after the adjustment has taken place.

In a further exemplary embodiment, one or more lighting means situated at the rear of the vehicle are automatically switched on when the rearview mirror is adjusted. As a result, the surroundings behind the vehicle are illuminated while the interior of the vehicle continues to remain dark, such that the edge of the rear window clearly stands out. When the rearview mirror is adjusted correctly, the entire edge of the rear window can be seen in the rearview mirror.

The one or more lighting means may be lighting means that are specifically provided for adjusting the rearview mirror. However, it is also possible to use lighting means that are present on the vehicle in any case. Thus, for example, it is possible to switch on backup lamps, tail lamps, brake lights or turn indicators at the rear of the vehicle for the purposes of illuminating the rearward surroundings of the vehicle while the rearview mirror is adjusted. As a rule, a sufficient illumination brightness for the rearward vehicle surroundings so that the edge of the rear window clearly stands out is obtained with individual ones or a plurality of the aforementioned lighting means present on the vehicle in any case. The effect is further amplified if objects which reflect at least some of the light emitted by the one or more lighting means are situated behind the vehicle, for example a garage wall, a fence or bushes.

When making use according to the invention of lighting means that are present in any case at the rear of the vehicle, as described above, it is possible, in addition to adjusting a rearview mirror that is attached in the interior of the vehicle to a windshield, to adjust rearview mirrors attached laterally to the outside of the vehicle on the basis of the lateral contour of the vehicle that stands out from the illuminated surroundings. However, it is naturally also possible to provide special lighting means at suitable positions for the purposes of adjusting the lateral rearview mirrors attached to the outside of the vehicle.

The first means for automatically switching on the one or more lighting means during the adjustment may, for example, comprise a sensor which identifies the driver making contact with the rearview mirror. Here, use is advantageously made of the fact that, in the case of rearview mirrors attached in the interior of the vehicle, the driver must carry out the adjustment manually and must, to this end, touch the rearview mirror.

The sensor is a capacitive contact sensor in one exemplary embodiment. The sensor is an optical proximity sensor in another exemplary embodiment. By way of example, optical proximity sensors are known from cellular telephones, where they are used to switch off the display when the user holds the phone against their ear during the telephone conversation. In a further exemplary embodiment, the sensor is formed by one or more switches which is or are attached in such a way that a hand which grips the rearview mirror for adjustment purposes actuates at least one of the switches.

The first means for automatically switching on the one or more lighting means during the adjustment may also comprise a sensor which identifies the driver making contact with or actuating an adjustment device or a remote control device for the rearview mirror. This exemplary embodiment is particularly advantageous if the rearview mirror is situated on the outside of the motor vehicle and adjustable from the interior of the motor vehicle by means of a mechanical or electrical remote control. It is possible to make contact with the adjustment device or the remote control device by the same means as the above-described identification of a hand making contact with or gripping the rearview mirror.

In an exemplary embodiment, an electrical signal that is produced by actuating an appropriate electrical adjustment device or remote control device is supplied to the first means for automatically switching on the one or more lighting means when the rearview mirror is adjusted. Typically, the signal will correspond to one of a plurality of directional signals for an actuator at the rearview mirror. Since an actuation direction is irrelevant for switching on the lighting, it is advantageous if the directional signals are ORed. The signal or signals trigger the one or more lighting means' being switched on. Expediently, the one or more lighting means should only be switched off after a certain period of time after the signal or signals fail to materialize. As a result, bothersome switching of the one or more lighting means on and off in quick succession can be avoided if there are short pauses between individual adjustment processes for the rearview mirror.

In principle, the one or more lighting means can be switched off in each of the exemplary embodiments with a time delay during a period of time after the rearview mirror has been adjusted. This gives the driver time to check the adjustment after assuming a seated position that is expedient for driving if the rearview mirror cannot be adjusted from such a position.

In an exemplary embodiment, the one or more lighting means are automatically switched on if an identification apparatus provided to this end identifies that a current driver is a different one than the driver who previously drove the motor vehicle. Here, in a variant, the one or more lighting means can be switched off only once the current driver has newly adjusted the rearview mirror or confirmed the correct adjustment to the identification apparatus by way of a signal.

By way of example, different drivers can be identified if an adjustment of the driver seat is changed. In this case, as a rule, an adjustment of the rearview mirror will also be required. A change in the seated position can be identified particularly easily if the seat adjustment is effectuated in an electric manner. An appropriate signal can easily be produced from the control signals for stepper motors and actuators of the seat adjustment.

Different drivers may also be identified by different alphanumeric codes assigned to individual drivers in each case, said alphanumeric codes being transmitted to the controller after input into an input appliance, by coded keys or transmitters assigned to individual drivers in each case, said keys or transmitters communicating with the controller, or by identifying biometric features of the drivers. By way of example, the identification of biometric features comprises facial recognition which is carried out by means of a camera. By way of example, a camera for identifying tiredness of the driver, provided in the motor vehicle in any case, may also be used to this end. The identification of biometric features further comprises voice recognition or identification of the weight or the size of the driver. A plurality of the identification methods mentioned above in an exemplary manner can be combined with one another as desired in order to increase the identification accuracy.

A configuration of the invention related to the weight identification described above, which may be combined with any one of the present exemplary embodiments, only switches on the one or more lighting means if the driver seat is loaded with a minimum weight, independently of other signals provided to this end. Thus, it is possible to avoid an unnecessary switch-on of the one or more lighting means, for example triggered by closing the door, and energy can be saved as a result thereof. The identification of a minimum loading may be effectuated by a seat occupancy identification feature present in the motor vehicle in any case, said seat occupancy identification often being provided as a reminder that a seatbelt should be put on.

Automatic switch-on and time-controlled switch-off of the lighting means after closing a driver door, after inserting or turning an ignition key or after actuating a starter button for the motor is likewise conceivable, particularly if special lighting means are provided for adjusting the rearview mirror or if lights at the rear of the vehicle are switched on to this end. In a variant, turning the ignition key or actuating a starter button for the motor may lead to a lighting means that is automatically switched on after closing the driver door being switched off again. In this variant, time-controlled switch-off may be dispensed with.

In one configuration of the invention, which is combinable with each of the exemplary embodiments present, the one or more lighting means are only switched on if the ambient brightness is below a certain value. By way of example, the ambient brightness can be captured by one or more light sensors. Such sensors are already present in many motor vehicles for automatically switching the dimmed headlamps and may be used for the invention.

In another configuration of the invention, which is combinable with each of the exemplary embodiments present, the one or more lighting means are only switched on if the speed of the motor vehicle is below a certain value. By way of example, the current speed can be transmitted to the first means by the speedometer. Alternatively, the one or more lighting means can only be switched on when the motor is at a standstill, wherein appropriate control signals are also transmitted to the first means in this case, for example from a motor controller. Here, this configuration also serves to avoid bothering or irritating road users driving behind the vehicle, particularly if the lighting means are formed by the brake lights, backup lamps and/or turn indicators present on the vehicle.

BRIEF DESCRIPTION OF THE DRAWINGS

Below, the invention is described on the basis of the figures in the drawing. In the drawing.

DETAILED DESCRIPTION

In the figures, the same or similar elements are provided with the same reference numbers.

Figure 1:
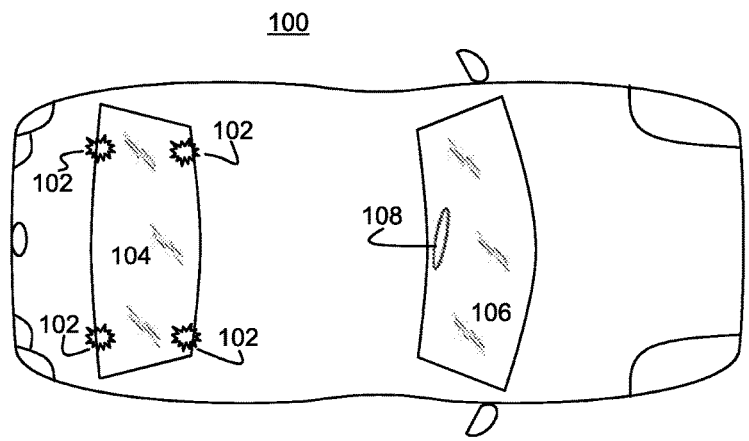
FIG. 1 shows a schematic exemplary arrangement of lighting means at a rear window of a motor vehicle as an adjustment aid for a rearview mirror.

FIG. 1 shows a schematic exemplary arrangement of lighting means 102 at a rear window 104 of a motor vehicle 100 as an adjustment aid for a rearview mirror 108 that is attached in the interior of the motor vehicle to a windshield 106. When looking into the correctly adjusted rearview mirror 108, a driver, who is not illustrated in the figure, should be able to identify the four lighting means 102 at appropriate positions in the rearview mirror. Otherwise, the driver must appropriately adjust the rearview mirror.

Figure 2:
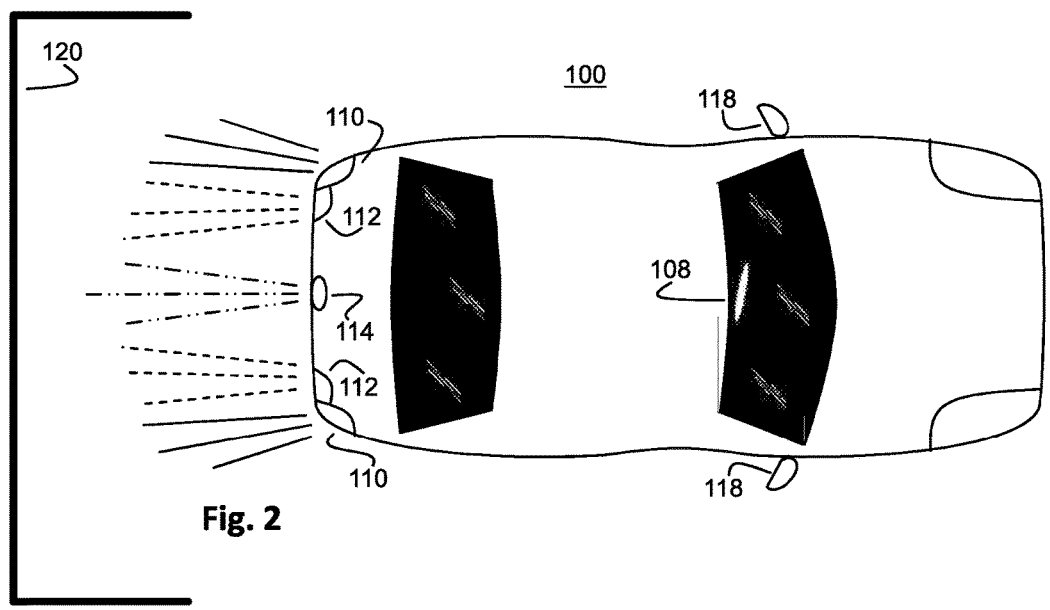
FIG. 2 shows an exemplary use according to the invention of lighting means present on a motor vehicle as an adjustment aid for a rearview mirror.

FIG. 2 shows an exemplary use according to the invention of lighting means present at the rear of a motor vehicle 100 as an adjustment aid for the rearview mirror 108. In this exemplary illustration, the lighting means comprise rear turn indicators 110, brake lights 112 and a backup lamp 114. According to the invention, one or more of the lighting means 110, 112 and 114 are switched on when the driver, not illustrated in the figure, adjusts the rearview mirror 108. In the figure, the light emitted by the lighting means 110, 112 and 114 is partly reflected by an object 120 situated behind the vehicle (the reflection is not illustrated). By way of example, the object 120 is made up of rear and lateral garage walls, which are only partly illustrated in the figure. In this embodiment of the invention, it is also possible to adjust the rearview mirrors 118 that are attached laterally to the outside of the vehicle, because the lateral contour of the vehicle stands out from the illuminated rear surroundings.

Figure 3:
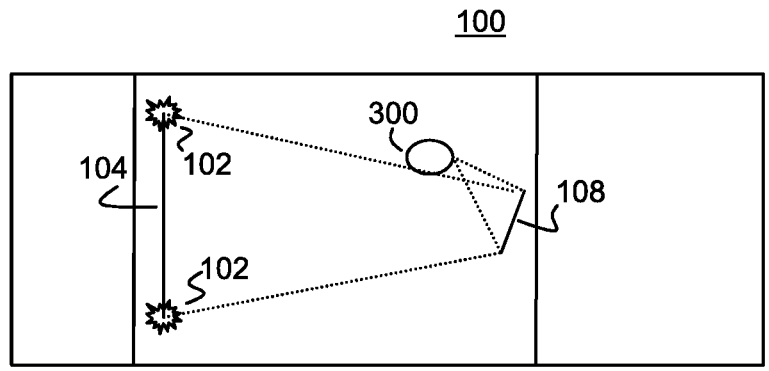
FIG. 3 shows a first simplified schematic illustration of the view of lighting means according to the invention by way of a rearview mirror.

FIG. 3 shows a first simplified schematic illustration of the view of lighting means according to the invention by way of a rearview mirror. The exemplary embodiment shown in the figure is similar to that shown in FIG. 1. In the figure, the motor vehicle 100 is only illustrated very schematically as a rectangle; likewise, the rearview mirror 108 is only reproduced as an oblique line and the rear window 104 is reproduced as a perpendicular line. Only two lighting means 102 are illustrated in the figure. The rearview mirror 108 is adjusted correctly in the figure and a driver 300, when looking into the rearview mirror 108, sees the lighting means 102 that are attached to, or in the vicinity of, the edges of the rear window 104 at an appropriate point in the rearview mirror 108. The field of view of the driver 300 as a result of the rearview mirror 108 is indicated by dotted lines in the figure.

Figure 4:
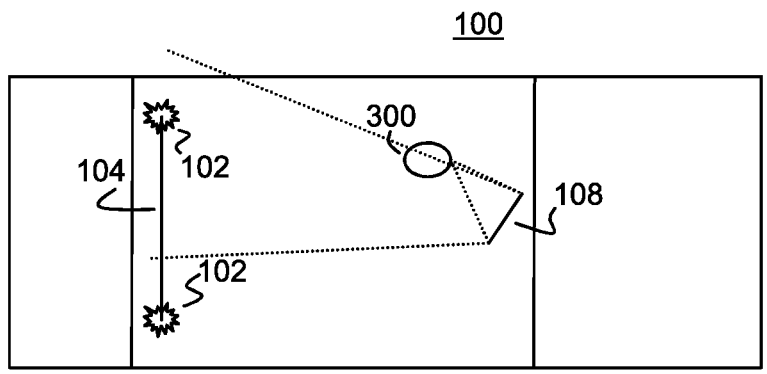
FIG. 4 shows a second simplified schematic illustration of the view of lighting means according to the invention by way of a rearview mirror.

FIG. 4 shows a second simplified schematic illustration of the view of lighting means according to the invention by way of a rearview mirror. The illustration substantially corresponds to the illustration in FIG. 3. The rearview mirror 108 is not adjusted correctly in the figure and a driver 300, when looking into the rearview mirror 108, only sees one of the lighting means 102 that are attached to, or in the vicinity of, the edges of the rear window 104. The field of view of the driver 300 as a result of the rearview mirror 108 is also indicated by dotted lines in this figure. It can clearly be seen that only the lighting means 102 that is arranged at the top in the figure is visible to the driver in the rearview mirror.

Figure 5:
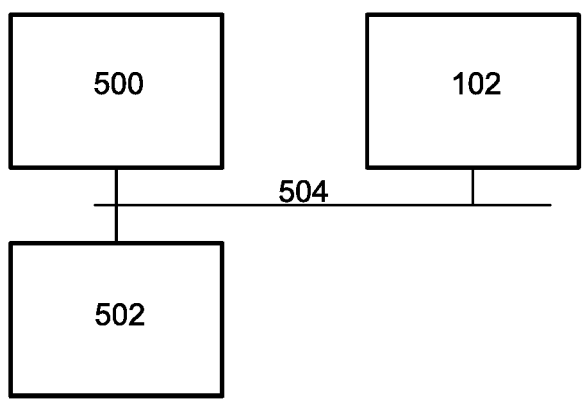
FIG. 5 shows a simplified block diagram of a control circuit according to the invention.

FIG. 5 shows a simplified block diagram of an adjustment aid according to the invention. One or more lighting means 102 have a communication link to a controller 500 and a sensor 502. The controller 500 and the sensor 502 form a first means which automatically switches on the one or more lighting means when the rearview mirror, which is not illustrated in the figure, is adjusted. Here, the sensor 502 is configured to determine when a driver (not shown) grips the rearview mirror or a device for adjusting the rearview mirror (not shown) in order to adjust the rearview mirror, and transmits appropriate data to the controller. By way of example, the link 504 can be established by a data bus, by way of individual signal lines or by way of a combination thereof. Further control information items from other components or assemblies of the vehicle may be supplied to the controller 500 via the data bus. The one or more lighting means can be directly actuated and switched on by the controller, or via a controller (not shown) which is assigned to the one or more lighting means and which can also be connected to other components of the motor vehicle via a further data bus. If necessary, data buses that are otherwise separated from one another may interchange data with one another via one or more appropriate gateways, wherein the interchange may be effectuated in a unidirectional or bidirectional manner. The controller executes program instructions which display and evaluate data coming from the sensor that indicate an adjustment of the rearview mirror, and switch on the one or more lighting means while the rearview mirror is adjusted.

The invention claimed is:

1. An adjustment aid for a rearview mirror in a motor vehicle, wherein one or more lighting means are arranged in the spatial vicinity of one or more edges of a rear window or at the rear of the motor vehicle in such a way that, when the motor vehicle is situated in dark surroundings and the one or more lighting means are switched on, the edge of the rear window or a lateral contour of the motor vehicle stands out, at least in portions, from the surroundings behind the motor vehicle when the rearview mirror is looked at, characterized in that a first means is provided, said first means automatically switching on the one or more lighting means when an adjustment of the rearview mirror becomes necessary, wherein the adjustment of the rearview mirror is assumed to be necessary if a change in the driver seat setting was identified.

2. The adjustment aid as claimed in claim 1, characterized in that first means are provided for identifying a change in a driver seat setting.

3. The adjustment aid as claimed in claim 1, characterized in that second means are provided, said second means continuing to keep the one or more lighting means switched on during a fixed or adjustable time period after the rearview mirror was adjusted.

4. The adjustment aid as claimed in claim 1, characterized in that a third means are provided for identifying loading of a driver seat with a certain minimum weight and in that the first means does not switch on the one or more lighting means if a driver seat is loaded with less than the minimum weight, independently of other signals that are provided to this end.

5. The adjustment aid as claimed in claim 1, characterized in that the first means only switches on the lighting means below a certain speed or when the motor of the vehicle is switched off.

6. The adjustment aid as claimed in claim 2, characterized in that the first means only switches on the lighting means below a certain speed or when the motor of the vehicle is switched off.

7. The adjustment aid as claimed in claim 3, characterized in that the first means only switches on the lighting means below a certain speed or when the motor of the vehicle is switched off.

8. The adjustment aid as claimed in claim 4, characterized in that the first means only switches on the lighting means below a certain speed or when the motor of the vehicle is switched off.

* * * * *